UNITED STATES PATENT OFFICE.

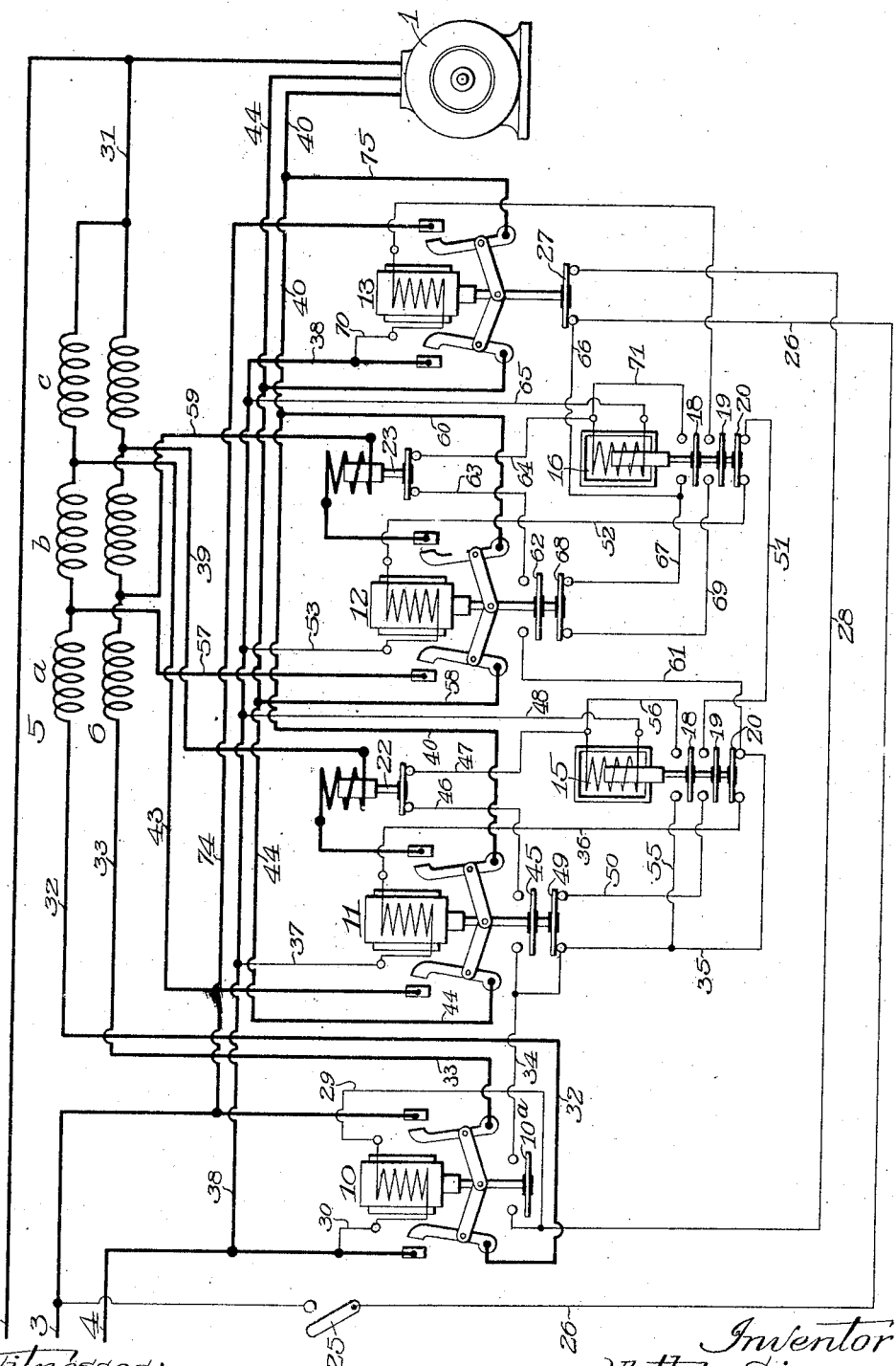

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

985,215.  Specification of Letters Patent.  Patented Feb. 28, 1911.

Application filed June 1, 1909. Serial No. 499,546.

*To all whom it may concern:*

Be it known that I, ARTHUR SIMON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors.

Where alternating current motors are started by means of potential regulating devices, it frequently occurs that the same become overloaded by reason of too rapid removal of the potential reducing means from circuit. Where a motor always starts under a given load, the danger of thus overloading the motor may be obviated by retarding the operation of the potential controlling means for a definite period. Such an arrangement, however, does not insure the protection of the motor when starting under varying loads.

It is, therefore, the object of my invention to provide means applicable to either a single phase or a polyphase motor for insuring protection thereof against overloads, regardless of the load under which the same is started.

A further object of my invention is to provide means for insuring the return of each potential controlling switch to initial position prior to the operation of a succeeding potential controlling switch.

Various other objects and advantages of my invention will be hereinafter set forth.

For the purpose of more fully disclosing the nature of my invention, I shall describe the controller diagrammatically illustrated in the accompanying drawing. The controller illustrated merely embodies my invention in one form and should, therefore, be considered simply as illustrative of the general features of my invention. Of course, my invention is susceptible of various modifications.

In the embodiment of my invention illustrated, I have shown the same as applied to the control of a polyphase motor 1, adapted to be supplied with current from a three phase circuit having supply lines 2, 3 and 4. However, as before stated, my invention is equally as applicable to single phase motors, and it is also applicable to polyphase motors other than the three phase type. In a controller for three phase motors, potential reducing means are sometimes provided for each phase, and sometimes for only two phases. While my invention comprehends the use of potential reducing means for each phase, I have only provided potential reducing means for two phases in the controller illustrated. The potential reducing means which I have illustrated comprise transformer windings; but, of course, it should be understood that other potential reducing means might be substituted therefor if desired. The transformer windings 5 and 6 are shown as comprising three sections each, the sections of each being designated as $a$, $b$ and $c$. Of course, more or less sections might be provided as desired. It will be understood that in practice each of the windings might be continuous and provided with suitable taps at the desired points.

The controller illustrated includes switches 10, 11, 12 and 13 each provided with a suitable operating winding. As will be hereinafter set forth, the switch 10 is arranged to connect the transformer windings across different phases of the supply circuit, while the switches 11 to 12 are arranged to connect the motor to different points on the transformer windings, and the switch 13 to connect the motor directly to the supply line. In practice, the switches 10 to 13 inclusive may be of any preferred type. For the purpose of illustration, I have shown the same of similar construction.

Main line 2 of the supply circuit is shown as connected directly to one terminal of the motor, and, therefore, the switch 10 is only required to complete two phases of the supply circuit. Therefore, said switch is merely of the double pole type. Of course, if it is desired to control all three phases of the motor, it would merely be necessary to substitute triple pole switches for the double pole swiches illustrated. Each of the switches 10 to 13 is provided with one or more auxiliary contacts, the functions of which will be hereinafter set forth.

Where transformers are used for regulating the potential impressed upon a motor, it is essential to obviate the danger of short-circuiting any section of the transformer winding as otherwise dangerous conditions might be set up in the motor. It is, therefore, necessary to insure the opening of each of the accelerating switches prior to the closure of the next succeeding switch. Of course, this result may be accomplished in various different ways. The means which I have shown for accomplishing this result comprise electroresponsive switches 15 and 16, each of which is provided with contact disks 18, 19 and 20. In one position of the switches 15 and 16 the contact disks 18 and 19 each bridge a pair of stationary contacts, while in another position thereof the contact disks 20 each bridge a pair of stationary contacts. The operation and function of these switches will be hereinafter set forth. In addition to the switches heretofore specified, I also provide electroresponsive relay switches 22 and 23, which, as will be hereinafter set forth, are responsive to excessive surges of current in the motor circuit to check the operation of the accelerating switches. The circuits of the operating windings of the several switches may be controlled in any preferred manner. For the purpose of illustration, I have shown a master switch 25 for initially controlling the energization of the switch.

I shall now describe the operation of the controller, at the same time setting forth the circuit connections therefor.

Assuming that the several switches are in the positions illustrated, the motor 1 will be disconnected from circuit. To start the motor, it is necessary to close the switch 25. Closure of the switch 25 completes a circuit from main line 3, by conductor 26, through an auxiliary switch 27 adapted to operate in unison with the switch 13, by conductors 28 and 29, through the operating winding of switch 10, by conductor 30 to main line 4. The operating winding of switch 10 is thus connected across one phase of the supply circuit and thereupon becomes energized. Closure of the switch 10 completes the following circuits. One circuit may be traced from main line 2 by conductor 31, through all of the sections of the transformer winding 5, by conductor 32, through one side of the switch 10 to main line 4. Another circuit may be traced from main line 2 and conductor 31, through the several sections of the transformer winding 6, by conductor 33, through the opposite side of the switch 10 to main line 3. It will thus be seen that closure of the switch 10 connects the transformer windings 5 and 6 across different phases of the supply circuit. At this time, the motor is not connected in circuit. However, upon closure of switch 10 the auxiliary switch 10$^a$ connected thereto is closed, thereby completing a circuit from conductor 28, through said auxiliary switch 10$^a$, by conductors 34 and 35, through contact disk 20 of the auxiliary switch 15, by conductor 36, through the operating winding of switch 11, by conductors 37 and 38 to main line 4. The winding of the switch 11 thereupon becomes energized, thereby closing said switch. Closure of the switch 11 connects the motor to the transformer windings 5 and 6. One phase of the motor may be traced from main line 2 directly to one terminal thereof. Another phase may be traced from conductor 3, through switch 10, by conductor 33, through the sections $a$ and $b$ of the transformer winding 6, by conductor 39, through the operating winding of relay switch 22, thence through one side of switch 11, by conductor 40 to another terminal of the motor. The third phase may be traced from main line 4, through switch 10 by conductor 32, through sections $a$ and $b$ of the transformer winding 5, by conductor 43, through the opposite side of switch 11, by conductor 44 to the third terminal of the motor. The motor is thus connected in circuit with a comparatively low potential impressed thereon.

As already set forth, closure of the switch 11 connects the operating winding of the relay switch 22 in circuit. Consequently, if upon establishment of the connections set forth, an excessive surge of current passes through the motor, the switch 22 will respond and will not return to initial position until normal conditions are restored in the motor circuit. Upon return of the relay switch 22 to initial position, or, if the same does not respond upon closure of switch 11, circuit will be closed from conductor 34 through the auxiliary switch 45 of switch 11, by conductor 46, through the relay switch 22, by conductor 47, through the operating winding of the auxiliary switch 15, by conductors 48 and 38 to main line 4. This will cause the energization of the winding 15, which will thereupon draw up its plunger. This, of course, will draw the contact disk 20, operated thereby, away from its stationary contacts, and, consequently, will open the circuit of the operating winding of the switch 11. The switch 11 will thereupon open and, at the same time, cause the contact disk 49, operated thereby, to complete a circuit from conductor 34 across said contact disk 49, by conductor 50 across the contact disk 19 of the auxiliary switch 15, by conductor 51, across the contact disk 20 of the auxiliary switch 16, by conductor 52, through the operating winding of switch 12, by conductor 53 to main line 4. Thereupon the winding of the switch 12 will be energized, thereby closing said switch.

Here it should be noted first that the operating winding of the auxiliary switch 15 is controlled by the relay switch 22 and, therefore, cannot respond as long as abnormal conditions exist in the motor. Therefore, inasmuch as the switch 15 controls the circuit of the operating winding of the switch 12, said switch 12 cannot close as long as abnormal conditions exist in the motor. It should also be noted that the auxiliary switch 49 of switch 11 is included in the circuit of the operating winding of the switch 12, and, therefore, said switch 12 cannot respond until the switch 11 has returned to initial position. This arrangement not only insures protection of the motor against overloads, but also obviates the danger of short-circuiting portions of the transformer windings, inasmuch as the accelerating switch 12 cannot close until the switch 11 has opened.

As soon as the switch 11 is opened, the energizing circuit of the operating winding of the auxiliary switch 15 is opened; but, as soon as the switch 15 has responded, it establishes a maintaining circuit for its own operating winding, which may be traced from conductor 35, by conductor 55, through the contact disk 18 thereof, by conductor 56, through its operating winding, and thence by conductor 48 as already traced. The establishment of this maintaining circuit renders the relay switch 22 ineffective to interrupt the circuit of the operating winding of the auxiliary switch 15.

Closure of the switch 12 removes the coils b of the transformer windings 5 and 6 from circuit, thereby increasing the potential impressed upon the motor. One phase of the motor circuit may then be traced from conductor 32, through the section a of transformer winding 5, by conductor 57, through one side of the switch 12, by conductors 58 and 44 to one terminal of the motor. Another phase may be traced, as already described, to conductor 33, thence through the section a of the transformer winding 6, by conductor 59, through the operating winding of the relay switch 23, and one side of the switch 12, by conductors 60 and 40 to another terminal of the motor. The third phase extends from conductor 2 directly to one terminal of the motor as already stated. The switch 23 is thus rendered responsive to excessive surges of current through the motor. If the switch 23 responds, it will interrupt the circuit of the operating winding of the auxiliary switch 16. As soon as the switch 23 returns to initial position, if it does respond, circuit will be closed from conductor 35, by conductor 61, through the auxiliary switch 62 of switch 12, thence by conductor 63, through the relay switch 23, by conductor 64, through the operating winding of the switch 16, by conductor 65 to main line 4. The switch 16 thereupon responds, withdrawing the contact disk 20 thereof from its stationary contact. This opens the circuit of the operating winding of the switch 12, thereby causing said switch to open. Upon the opening of the switch 12, a circuit is closed from conductor 26 of the switch 13, by conductors 66 and 67, through the auxiliary contact disk 68 of the switch 12, by conductor 69, through the operating winding of the switch 13, by conductor 70 to the main line 4. The switch 23 thus checks the operation of the auxiliary switch 16 as long as abnormal conditions exist in the motor, while the switch 16 in turn checks the operation of the switch 13. The switch 16 also insures the opening of the switch 12 prior to the closure of the switch 13 in the same manner as switch 15 insures the opening of the switch 11 prior to the closure of the switch 12. Of course, opening of the switch 12 tends to deënergize the operating winding of the switch 16. But upon operation of the switch 16 a maintaining circuit is established for its own winding, which may be traced from conductor 66 across contact disk 18 thereof, by conductor 71, through its operating winding as already traced. The establishment of this maintaining circuit renders the relay device 23 ineffective to interrupt the circuit of the operating winding of the switch 16 after the same has once responded.

Closure of the switch 13 causes the auxiliary contact 27 thereof to disengage its stationary contacts. This, of course, interrupts the circuit of the operating winding of the starting switch 10, which thereupon opens, disconnecting the transformer windings from circuit. Closure of the switch 13 connects the motor directly to the supply lines, thereby causing the maximum potential to be impressed thereon. Upon closure of the switch 13, one phase of the motor circuit may be traced from main line 4 by conductor 38, through one side of the switch 13, by conductor 44 to the center terminal of the motor. Another phase may be traced from main line 3 by conductor 74, through the other side of the switch 13, by conductors 75 and 40 to another terminal of the motor. The third phase may be traced directly from supply line 2 to one terminal of the motor.

I claim—

1. In a controller for electric motors, in combination, a plurality of accelerating devices, means insuring the return of each of said devices to initial position prior to the operation of another device, and means for checking the operation of said devices while abnormal conditions exist in the motor.

2. In a controller for electric motors, in combination, a plurality of automatic switches arranged to operate successively to accelerate the motor, interlocks between said switches for insuring the opening of each switch prior to the operation of the next succeeding switch, and means for checking the successive operation of said switches while abnormal conditions exist in the motor.

3. In a controller for electric motors, in combination, a plurality of automatic switches arranged to operate successively to accelerate the motor, and electroresponsive means for checking the successive operation of said switches upon the occurrence of abnormal conditions in the motor and insuring the return of each switch to initial position prior to the operation of another switch.

4. In a controller for electric motors, in combination, a plurality of automatic accelerating switches, automatic means for causing successive operation of said switches, and for causing each switch to return to initial position prior to the operation of the next succeeding switch, and means responsive to excessive surges of current for checking the operation of said switches.

5. In a controller for electric motors, in combination, a plurality of automatic accelerating switches, automatic means for causing successive operation of said switches, and for causing each switch to return to initial position prior to the operation of the next succeeding switch, and means responsive to abnormal conditions in the motor for controlling said first mentioned means to protect the motor.

6. In a controller for an alternating current motor, in combination, a switch for establishing starting connections, switches for accelerating the motor and establishing running connections therefor, means for checking the operation of said last mentioned switches upon the occurrence of abnormal conditions in the motor, and automatic means for causing said first mentioned switch to open when the last of said second mentioned switches has operated.

7. In a controller for an alternating current motor, in combination, a switch for establishing starting connections, switches for accelerating the motor and establishing running connections therefor, means for checking the operation of said last mentioned switches upon the occurrence of abnormal conditions in the motor, and automatic means for causing each of said last mentioned switches to open prior to the closure of a succeeding switch and for causing said first mentioned switch to open upon the establishment of running connections.

8. In a controller for electric motors, in combination, two electroresponsive switches, an electroresponsive controlling device adapted to respond to deënergize the operating winding of one switch and cause the energization of the operating winding of the other switch, and means for checking the operation of the second switch while abnormal conditions exist in the motor, said means being ineffective to directly control said first mentioned switches.

9. In a controller for electric motors, in combination, two electroresponsive switches, an electroresponsive controlling device adapted to respond to deënergize the operating winding of one switch and cause the energization of the operating winding of the other switch, and a switch responsive to excessive surges of current through the motor for controlling the circuit of the operating winding of said controlling device, the circuits of said first mentioned switches being independent of said last mentioned switch.

10. In a controller for alternating current motors, in combination, voltage reducing means, a plurality of switches including a starting switch for connecting said voltage reducing means in circuit and accelerating switches for removing said voltage reducing means from circuit and establishing running connections, means for checking the successive operation of the accelerating switches, and means for insuring the opening of the starting switch upon the establishment of running connections.

11. In a controller for alternating current motors, in combination, voltage reducing means, a plurality of switches including a starting switch for connecting said voltage reducing means in circuit and accelerating switches for removing said voltage reducing means from circuit and establishing running connections, means for checking the successive operation of the accelerating switches, means insuring the opening of each of said accelerating switches prior to the operation of its next succeeding switch, and means insuring the opening of the starting switch upon the establishment of running connections.

12. In a controller for alternating current motors, in combination, voltage reducing means arranged to be connected in circuit with the motor, automatic switches for disconnecting the voltage reducing means from circuit and establishing running connections for the motor, and means controlled by said switches and adapted to automatically cause said switches to operate successively and to cause each switch to open prior to the operation of the next succeeding switch.

13. In a controller for electric motors, in combination, voltage reducing means arranged to be connected in circuit with the motor, automatic switches for disconnecting said voltage reducing means from circuit and establishing running connections for the motor, and electroresponsive means controlled by said switches and arranged to cause successive operation of said switches and to insure the opening of each switch prior to the closure of the next succeeding switch.

14. In a controller for electric motors, in combination, voltage reducing means arranged to be connected in circuit with the motor, automatic switches for disconnecting said voltage reducing means from circuit and establishing running connections for the motor, electroresponsive means controlled by said switches and arranged to cause successive operation of said switches and to insure the opening of each switch prior to the closure of the next succeeding switch, and means responsive to excessive surges of current through the motor for controlling the operation of said electroresponsive means to check the successive operation of said switches.

15. In a controller for electric motors, in combination, two electroresponsive switches, and an auxiliary electroresponsive switch arranged to respond upon closure of one of said switches to deënergize the operating winding thereof and to cause the energization of the operating winding of the other of said first mentioned switches, the energizing circuit of said auxiliary switch being independent of the second of said first mentioned switches.

16. In a controller for electric motors, in combination, two electroresponsive switches, an auxiliary electroresponsive switch arranged to respond upon closure of one of said switches to deënergize the operating winding thereof and to cause the energization of the operating winding of the other of said first mentioned switches, and an electroresponsive device arranged to render said auxiliary switch unresponsive while abnormal conditions exist in the motor circuit, the energizing circuits of said first mentioned switches being independent of said electroresponsive device.

17. In a controller for electric motors, in combination, a plurality of electroresponsive accelerating switches and a plurality of separate electroresponsive auxiliary switches not included in the motor circuit, each adapted to respond upon closure of one of said accelerating switches to cause the deënergization thereof and to cause the energization of another of said accelerating switches.

18. In a controller for electric motors, in combination, a plurality of electroresponsive accelerating switches, a plurality of electroresponsive auxiliary switches, each adapted to respond upon closure of one of said accelerating switches to cause the deënergization thereof and to cause the energization of another of said accelerating switches, and a plurality of relay switches responsive to excessive surges of current through the motor for rendering said auxiliary switches unresponsive while abnormal conditions exist in the motor to check the successive operation of said accelerating switches.

19. In a controller for electric motors, in combination, a plurality of electroresponsive accelerating switches, a plurality of electroresponsive auxiliary switches, each adapted to respond upon closure of one of said accelerating switches to cause the deënergization thereof and to cause the energization of another of said accelerating switches, and a plurality of relay switches for rendering said auxiliary switches unresponsive while abnormal conditions exist in the motor to check the successive operating of said accelerating switches, each of said relay switches being rendered unresponsive upon closure of a corresponding accelerating switch.

20. In a controller for electric motors, in combination, voltage reducing means, a plurality of electroresponsive switches arranged to control said voltage reducing means and to establish running connections for the motor, an electroresponsive starting switch arranged to cause the first of said first mentioned switches to respond, a plurality of auxiliary electroresponsive switches, each arranged to respond upon closure of one of said first mentioned switches to cause the deënergization thereof and to cause the energization of another of said switches, and means for causing the deënergization of said starting switch upon the establishment of running connections.

21. In a controller for electric motors, in combination, voltage reducing means, a plurality of electroresponsive switches arranged to control said voltage reducing means and to establish running connections for the motor, an electroresponsive starting switch arranged to cause the first of said first mentioned switches to respond, a plurality of auxiliary electroresponsive switches, each arranged to respond upon closure of one of said first mentioned switches to cause the deënergization thereof and to cause the energization of another of said switches, means for causing the deënergization of said starting switch upon the establishment of running connections, and a plurality of relay switches, each arranged to control one of said auxiliary switches to render the same unresponsive while abnormal conditions exist in the motor.

22. In a controller for electric motors, in combination, a transformer winding, successively operated switches for connecting the motor to the transformer windings and for establishing running connections for the motor, separate automatic means for rendering said switches ineffective to short-circuit any portion of the transformer winding, and means for checking the operation of said switches upon the occurrence of abnormal conditions in the motor circuit.

In witness whereof, I have hereunto subscribed my name in the presence of two witnesses.

ARTHUR SIMON.

Witnesses:
FRANK H. HUBBARD,
WALTER E. SARGENT.

Copies of this patent may be obtained for five cents each, by addressing the "Commissioner of Patents, Washington, D. C."